(12) United States Patent
Nakagawa et al.

(10) Patent No.: US 12,532,816 B2
(45) Date of Patent: Jan. 27, 2026

(54) NURSERY POT BODY WITH TEMPORAL STABILITY AND DECOMPOSITION ACCELERATING METHOD THEREFOR

(71) Applicants: NIPPON BEET SUGAR MANFACTURING CO., LTD., Tokyo (JP); TOPPAN, INC., Tokyo (JP); NATIONAL AGRICULTURE AND FOOD RESEARCH ORGANIZATION, Ibaraki (JP); GOYO PAPER WORKING CO., LTD., Osaka (JP)

(72) Inventors: Takuya Nakagawa, Obihiro (JP); Yasuomi Ota, Obihiro (JP); Naohiro Kawamura, Tokyo (JP); Tokuya Sasaki, Tokyo (JP); Hiroko Kitamoto, Ibaraki (JP); Michinori Nakamoto, Osaka (JP)

(73) Assignees: NIPPON BEET SUGAR MANUFACTURING CO., LTD., Tokyo (JP); TOPPAN INC., Tokyo (JP); NATIONAL AGRICULTURE AND FOOD RESEARCH ORGANIZATION, Ibaraki (JP); GOYO PAPER WORKING CO., LTD., Osaka (JP)

( * ) Notice: Subject to any disclaimer, the term of this patent is extended or adjusted under 35 U.S.C. 154(b) by 361 days.

(21) Appl. No.: 17/759,948

(22) PCT Filed: Feb. 3, 2021

(86) PCT No.: PCT/JP2021/003951
§ 371 (c)(1),
(2) Date: Aug. 2, 2022

(87) PCT Pub. No.: WO2021/157618
PCT Pub. Date: Aug. 12, 2021

(65) Prior Publication Data
US 2023/0077099 A1    Mar. 9, 2023

(30) Foreign Application Priority Data
Feb. 3, 2020   (JP) .................... 2020-016376

(51) Int. Cl.
*A01G 9/029* (2018.01)
*B32B 27/08* (2006.01)
(Continued)

(52) U.S. Cl.
CPC ............ *A01G 9/0291* (2018.02); *B32B 27/08* (2013.01); *B32B 27/10* (2013.01); *B32B 27/36* (2013.01);
(Continued)

(58) Field of Classification Search
CPC ...... A01G 9/0291; B32B 27/08; B32B 27/10; B32B 27/36; B32B 2270/00; B32B 2307/7163
See application file for complete search history.

(56) References Cited

U.S. PATENT DOCUMENTS

2013/0101865 A1*  4/2013  Ren .................. D21H 19/82
428/481

FOREIGN PATENT DOCUMENTS

JP         38-25715 S        9/1963
JP      2004121054 A   *   4/2004
(Continued)

OTHER PUBLICATIONS

Google Machine Translation to English of JP2004-121054 (Year: 2004).*
(Continued)

*Primary Examiner* — Frank J Vineis
*Assistant Examiner* — Laura B Figg
(74) *Attorney, Agent, or Firm* — Chrisman Gallo Tochtrop LLC

(57) ABSTRACT

[Problem to be Solved] Provided is a nursery pot body having stability over time, exhibiting suppressed decomposition during seedling raising, maintaining sufficient strength at the time of planting, and being rapidly degraded after planting in a field through enzyme treatment immediately before and/or immediately after planting.
[Solution] Base paper for a nursery pot body is characterized in that a biodegradable resin layer is provided on at least one surface of a paper substrate, wherein the biodegradable resin layer contains at least 15 mass % of a polylactic acid relative
(Continued)

Tensile strength before/after soil-burial of 30μm thick sample (less than 1 year after production) bar=S.D (n=4)

Tensile strength before/after soil-burial of 30μm thick sample (2 years after production) bar=S.D (n=4)

to 100 mass % of a biodegradable resin composition, and a nursery pot body is produced by molding the base paper.

5 Claims, 5 Drawing Sheets

(51) Int. Cl.
*B32B 27/10* (2006.01)
*B32B 27/36* (2006.01)
(52) U.S. Cl.
CPC ... *B32B 2270/00* (2013.01); *B32B 2307/7163* (2013.01)

(56) References Cited

FOREIGN PATENT DOCUMENTS

| | | | |
|---|---|---|---|
| JP | 2009-108264 | A | 5/2009 |
| JP | 4543393 | B2 | 9/2010 |
| JP | 4763123 | B2 | 8/2011 |
| JP | 2013-023643 | A | 2/2013 |
| JP | 5849297 | B2 | 1/2016 |
| JP | 6126486 | B2 | 5/2017 |
| JP | 6338183 | B2 | 6/2018 |
| JP | 6413117 | B2 | 10/2018 |
| KR | 100974639 | B1 | 8/2010 |

OTHER PUBLICATIONS

Taiwanese Office Action dated Nov. 4, 2024 for corresponding Application No. 110104077 and English translation.
Chinese Office Action dated Jun. 17, 2023 for corresponding Chinese Application No. 202180012304.8 and English translation.
Yukiko Shinozaki et al., "Biodegradable plastic-degrading enzyme from Pseudozyma anatarctica: closing, sequencing, and characterization", Appl Microbiol Biotechnol, 2013, 97:2951-2959, DOI 10.1007/s00253-012-4188-8 (cited on p. 2 of the specification).
Ken Suzuki et al., "Purification, characterization, and cloning of the gene for a biodegradable plastic-degrading enzyme from Paraphoma-related fungal strain B47-9", Appl Microbiol Biotechnol, 2014, 98:4457-4465, DOI 10.1007/s00253-013-5454-0 (cited on p. 2 of the specification).
Ken Suzuki et al., "Affinity purification and characterization of a biodegradable plastic-degrading enzyme from a yeast isolated from the larval midgut of a stag beetle, Aegus laevicollis", Appl Microbiol Biotechnol, 2013, 97:7679-7688, DOI 10.1007/s00253-012-4595-x (cited on p. 2 of the specification.
Takashi Watanabe et al., "A UV-induced mutant of Cryptococcus flavus GB-1 with increased production of a biodegradable plastic-degrading enzyme", Process Biochemistry 50, 2015, 1718-1724 (cited on p. 2 of the specification).
International Search Report for corresponding International Application No. PCT/JP2021/003951 mailed Apr. 20, 2021.
Written Opinion for corresponding International Application No. PCT/JP2021/003951 dated Apr. 20, 2021.

\* cited by examiner

Tensile strength before/after soil-burial of 30 μm thick sample (less than 1 year after production) bar=S.D (n=4)

Tensile strength before/after soil-burial of 30 μm thick sample (2 years after production) bar=S.D (n=4)

Tensile strength before/after soil-burial of 15μm thick sample (less than 1 year after production) bar=S.D (n=4)

Tensile strength before/after soil-burial of 15μm thick sample (2 years after production) bar=S.D (n=4)

Tensile strength before/after soil-burial of 30μm thick sample
(2 years after production)  bar=S.D (n=4) / 2 weeks after soil-burial Tensile strength before/after soil-burial of 30μm thick sample
(2 years after production)  bar=S.D (n=4) / 4 weeks afftter soil-burial Tensile strength before/after soil-burial of 30μm thick sample
(less than 1 year after production・treated by Corona treatment)
bar=S.D (n=4) / 2 weeks after soil-burial Tensile strength before/after soil-burial of 30μm thick sample
(less than 1 year after production・treated by Corona treatment)
bar=S.D (n=4) / 4 weeks after soil-burial Tensile strength before/after soil-burial of 30μm thick sample
(less than 1 year after production・no Corona treatment)
bar=S.D / (n=4)  2 weeks after soil-burial Tensile strength before/after soil-burial of 30μm thick sample
(less than 1 year after production・no Corona treatment)
bar=S.D (n=4) / 4 weeks after soil-burial

NURSERY POT BODY WITH TEMPORAL STABILITY AND DECOMPOSITION ACCELERATING METHOD THEREFOR

CROSS-REFERENCE TO RELATED APPLICATIONS

This application is a national stage entry of International Application No. PCT/JP2021/003951 filed on Feb. 3, 2021, which claims the benefit of priority to Japanese Application No. JP2020-016376, filed Feb. 3, 2020, the entire disclosures of which are hereby incorporated herein by reference.

TECHNICAL FIELD

The present invention relates to a nursery pot body for use in the fields of agriculture or horticulture, and relates to base paper for the nursery pot body, which is characterized by: maintaining the form of a pot body while seedlings are raised; enabling the pot body directly planted in the ground after the seedlings have been raised; being quickly biodegraded after planting; and even excelling in temporal stability during long-term storage. Further, the present invention relates to a nursery pot body molded with the base paper and a method for accelerating decomposition of the nursery pot body.

BACKGROUND ART

Conventionally, a nursing-seedlings and transplanting cultivation method, which involves cultivating plants using a paper pot body processed into a square or hexagonal columnar shape, has been in wide practical use. This cultivation method involves filling a paper-made square or hexagonal columnar pot body with potting soil, sowing seedlings therein, raising the seedlings under irrigation control, and planting pot seedlings into cultivated land, the pot seedlings being defined as the seedlings that have been raised in a pot and remain in the pot.

Patent Literature 1 discloses continuous assembling pot bodies for nursing-seedlings and transplantation, the continuous assembling pot bodies being structured as a body in which each individual square or hexagonal tubular pot body is connected via link pieces. Further, Patent Literature 2 discloses that it is necessary to maintain the continuous state of continuous pot seedlings without them being individually separated, when the pot seedlings are successively pulled out from one end of a simple transplanter and sequentially planted from the transplanter.

Patent Literature 3 and Patent Literature 4 disclose that a nursery pot, which is prepared using a laminated sheet provided with a thermoplastic biodegradable resin layer on the paper substrate thereof, has rapid decomposition properties after the nursery pot has been planted in cultivated land.

Furthermore, Patent Literature 5 and Patent Literature 6 disclose techniques by which to control decomposition progress at arbitrary time intervals in such a manner by directly administering a microorganism-derived enzyme to an agricultural mulch film laid over cultivated land.

CITATION LIST

Patent Literature

Patent Literature 1: Japanese Patent No. 4543393
Patent Literature 2: Japanese Patent No. 6126486
Patent Literature 3: Japanese Patent No. 4763123
Patent Literature 4: Japanese Patent Laid-Open No. 2004-121054
Patent Literature 5: Japanese Patent No. 6338183
Patent Literature 6: Japanese Patent No. 5849297
Patent Literature 7: Japanese Patent S38-25715.B
Patent Literature 8: Japanese Patent No. 6413117

Non Patent Literature

Non Patent Literature 1: Biodegradable plastic-degrading enzyme from *Pseudozyma antarctica*: cloning, sequencing, and characterization. Appl Microbiol Biotechnol. Applied Microbiology and Biotechnology: Vol. 97 No. 7 Page. 2951-2959 (2013 April)
Non Patent Literature 2: Purification, characterization, and cloning of the gene for a biodegradable plastic-degrading enzyme from *Paraphoma*-related fungal strain B47-9. Applied Microbiology and Biotechnology: Vol. 98 No. 10 Page. 4457-4465 (2014 May)
Non Patent Literature 3: Affinity purification and characterization of a biodegradable plastic-degrading enzyme from a yeast isolated from the larval midgut of a stag beetle, Aegus laevicollis. Applied Microbiology and Biotechnology: Vol. 97 No. 17 Page. 7679-7688 (2013 September)
Non Patent Literature 4: A UV-induced mutant of *Cryptococcus flavus* GB-1 with increased production of a biodegradable plastic-degrading enzyme. Process Biochemistry: Vol. 50 No. 11 Page. 1718-1724 (2015 November)

SUMMARY OF INVENTION

Technical Problem

As proposed or suggested in Patent Literature 1 and Patent Literature 2, paper used in the continuous pot bodies should have physical strength (that is, tensile strength), which allows the paper to withstand tension mainly exerted while the pot bodies are sequentially pulled out and finally planted in cultivated land. However, considering conventional base paper of nursery pot bodies, as the base paper should obtain sufficient strength during the nursery period and at the time of planting, it generally slows the decomposition rate of the base paper after being planted in the cultivated land. Therefore, if decomposition has not yet been completed by the time the next crop is planted, that is, if there is incomplete decomposition, this will hinder agricultural work and crop harvesting. For this reason, the nursery pot bodies need to retain both contrasting properties of: suppressing decompositional progress when raising seedlings, thereby retaining sufficient strength at the time of planting; and, on the other hand, quickly decomposing after the nursery pot bodies have been planted in the cultivated land.

Patent Literature 3 and Patent Literature 4 disclose that the nursery pots have decompositional properties after being planted in the cultivated land. This is because of the thermoplastic biodegradable resin layer that is applied to the nursery pots. However, techniques for arbitrarily controlling decomposition, between when the seedlings are raised and after the seedlings are planted in the cultivated land, have not yet been established.

Further, Patent Literature 5 and Patent Literature 6 disclose techniques for controlling biodegradational progress of the agricultural mulch films at arbitrary time intervals by directly administering the microorganism-derived enzyme to the films. However, in the first place, the agricultural mulch films and the pot bodies used for raising seedlings differ from each other in the intended use of each applicable material and the situations/conditions in which the materials are applied. Further, they differ from each other in terms of the properties of each manufactured product, that are the physical strength and chemical nature, etc. that are required. Thus, it is not so simple to state that the mulch films and the pot bodies discussed above can be replaceably used.

As stated, the nursery pot body needs to obtain sufficient strength during the nursery period of the seedlings and at the time of planting; however, the nursery pot body may deteriorate with time after production. Accordingly, the base paper for the nursery pot body needs to have temporal stability.

Solution to Problem

The present invention has been made to solve the above problems, and one type of biodegradable resins may be used while two or more types thereof may be used in combination. Among them, base paper for a nursery pot body, which is finished by laminating a biodegradable resin composition containing each biodegradable resin blended in the specific ratio (described hereinafter) on at least one surface of the paper, is provided. Further, the present invention enables the nursery pot body to ongoingly have certain strength when planting, and to control the decompositional progress thereof after planting. This will be done by treating the nursery pot body made of the base paper with a microorganism-derived enzyme immediately before and/or immediately after planting, which thus provides the nursery pot body with excellent temporal stability.

The present invention thus relates to the following group of inventions.

1. A base paper for a nursery pot body, comprising a biodegradable resin composition containing 15 mass % or more of a polylactic acid resin as a resin (A), the biodegradable resin composition being laminated on a paper substrate.
2. The base paper for a nursery pot body according to 1 above, wherein the biodegradable resin composition contains an aliphatic polyester resin other than the polylactic acid resin, the aliphatic polyester resin being defined as a resin (B), and a mass ratio between the resin (A) and the resin (B) is 15:85 to 40:60.
3. The base paper for a nursery pot body according to 1 above, wherein the biodegradable resin composition contains an aliphatic polyester resin other than the polylactic acid resin, the aliphatic polyester resin being defined as a resin (B), and contains an aromatic polyester resin as resin (C), the resin (B) is contained in an amount ranging from 30 mass % to 84.9 mass % relative to the total mass of the biodegradable resin composition, and the resin (C) is contained in an amount ranging from 0.1 mass % to 30 mass % relative to the total mass of the resin composition.
4. The base paper for a nursery pot body according to any one of 1 to 3 above, wherein the resin (A) is a polylactic acid.
5. The base paper for a nursery pot body according to any one of 2 to 4 above, wherein the resin (B) is an aliphatic polyester resin prepared by polycondensing a dicarboxylic acid component comprising an aliphatic dicarboxylic acid and a diol component comprising an aliphatic diol.
6. The base paper for a nursery pot body according to any one of 2 to 5 above, wherein the resin (B) is at least one type selected from polybutylene succinate (PBS), polybutylene succinate adipate (PBSA) and polyhydroxybutyrate.
7. The base paper for a nursery pot body according to any one of 3 to 6 above, wherein the resin (C) is an aromatic polyester resin prepared by polycondensing a dicarboxylic acid component comprising an aliphatic dicarboxylic acid and an aromatic dicarboxylic acid and a diol component comprising an aliphatic diol.
8. The base paper for a nursery pot body according to any one of 3 to 7 above, wherein the resin (C) is polybutylene adipate terephthalate (PBAT).
9. A nursery pot body, comprising the base paper for a nursery pot body according to any one of 1 to 8 above.
10. A method for decomposing a nursery pot body with a step of bringing a biodegradable resin-decomposing enzyme into contact with the nursery pot body according to 9 so as to biodegrade the nursery pot body.
11. The method for decomposing the nursery pot body according to 10 above, wherein the biodegradable resin-decomposing enzyme is a biodegradable resin-decomposing enzyme produced by at least one type of microorganisms selected from the group consisting of a yeast of the genus *Pseudozyma*, a yeast of the genus *Cryptococcus*, a filamentous fungus of the genus *Acremonium*, a filamentous fungus of the genus *Alternaria*, a filamentous fungus of the genus *Arthrinium*, a filamentous fungus of the genus *Aureobasidium*, a filamentous fungus of the genus *Cladosporium*, a filamentous fungus of the genus *Epicoccum*, a filamentous fungus of the genus *Fusarium*, a filamentous fungus of the genus *Paraphoma* and a filamentous fungus of the genus *Penicillium*.

Advantageous Effects of Invention

The present invention provides the base paper for the nursery pot body and the nursery pot body carrying with the following characteristics.

Specifically, the nursery pot body comprising the base paper for the nursery pot body of the present invention is able to suppress the decomposition thereof while seedlings are raised. This enables the nursery pot body to have sufficient strength while the seedlings are raised and when the seedlings are planted. This thus allows workers to do their planting work at cultivated land without delay. Since the nursery pot body maintains its form while the seedlings are raised, it is possible for the seedlings not to be damaged when planting, thereby enabling the planting survival rate to be high. Further, the nursery pot body comprising the base paper for the nursery pot body of the present invention excels in temporal stability even during long-term storage. Still further, the nursery pot body is subjected to enzyme treatment immediately before and/or immediately after being planted in cultivated land, so that the biodegradative progress of the pot body is controllable in the soil. Accordingly, this allows the pot body to be gradually decomposed. As a result, this enables seedlings' roots to freely extend, thereby contributing to the growth of the seedlings without hindrance. Lastly, the present invention can reduce the amount of nursery pot body residues, which are to be generated through insufficient decomposition. Accordingly, the next cropping will not be affected thereby.

DESCRIPTION OF EMBODIMENTS

<Nursery Pot Body>

Figure 1:
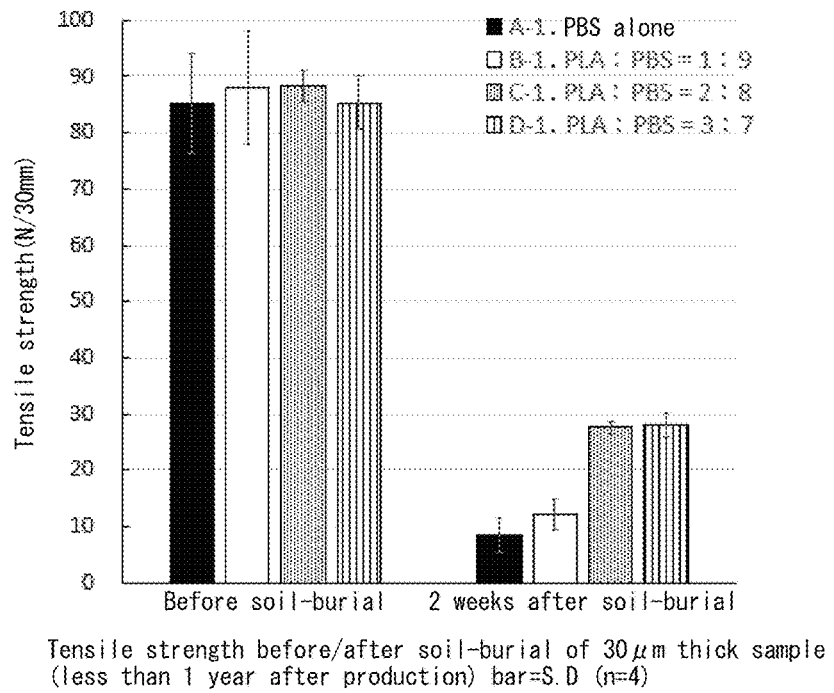
FIG. 1 shows the tensile strengths of biodegradable resin composition-laminated paper (lamination thickness: 30 μm) samples not subjected to enzyme treatment, graph (A): samples less than one year after production, after two weeks of soil-burial, and graph (B): samples two years after production, after two weeks of soil-burial.
Figure 1:
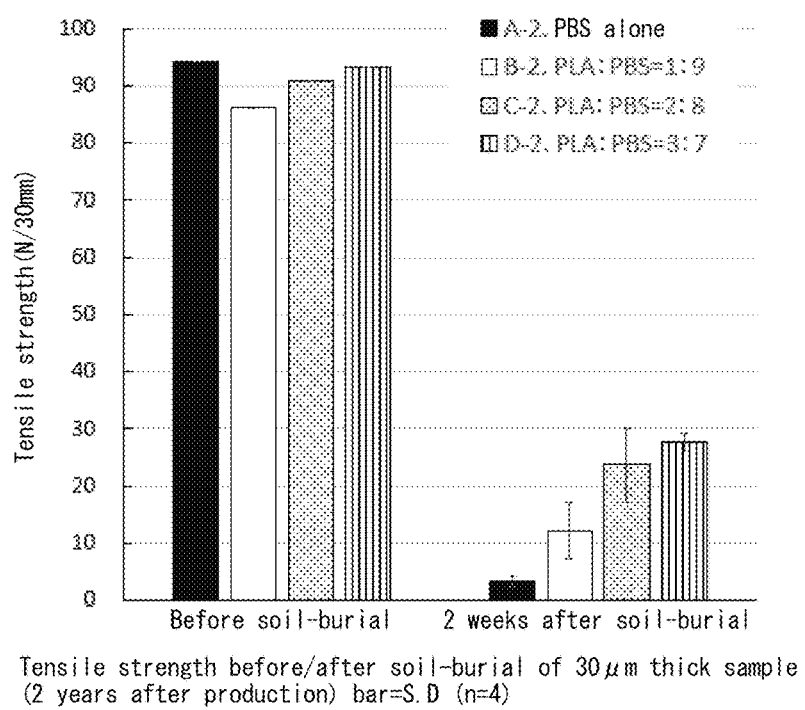

The nursery pot body is formed by molding laminated paper containing a biodegradable resin composition laminated on at least one surface of the paper substrate into a square or hexagonal columnar shape. Further, the individual pot bodies were connected via link pieces, so that continuous pot bodies can be formed.

The main properties required for the base paper for a nursery pot body are: (1) having paper strength during drying, with which the base paper can withstand mechanical processing such as bending and elongation during production of pot bodies; (2) difficult to be deteriorated over time after production of pot bodies; (3) having resistance to biodegradation (rot resistance) by microorganisms while raising seedlings; (4) maintaining rot resistance so as to have paper strength when wet to withstand mechanical and artificial handling upon planting in a field after seedling raising; and (5) having brittleness that allows rapid root extension from the pot side wall after planting regardless of the nature of the soil and having a soil-disintegrating property with which the base paper is biodegraded due to the action of soil microorganisms etc.

In particular, biodegradation properties (the above property (5)) that contradict resistance such as deterioration resistance (the above property (2)) and rot resistance (the above property (3)) before planting are required after planting. It is thus a challenge to establish the above-mentioned contradictory properties in one type of the base paper for a nursery pot body. In addition, depending on the crop to be subjected to application or the mode of work thereof, the specifications of the nursery pot body (as described below, for example, the difference between Patent Literature 1 and Patent Literature 7), the raising seedlings period, the conditions for controlling seedling raising (control temperature, irrigation amount, etc.), the paper strength of the nursery pot body at the time of wetting, which is required at the time of planting, and the like are different. Hence, each of properties (1) to (5) is balanced and adjusted so as to be within an appropriate range. Accordingly, it is necessary to appropriately set the physical and chemical strength etc., of the nursery pot body according to various crops.

Specifically, property (4) can be represented using the tensile strength as an index (measured using an autograph tensile tester according to JIS P8113: 1998). When it is assumed that a continuous assembling pot bodies for nursing-seedling and transplantation disclosed in Patent Literature 1 is planted using a simple transplanter disclosed in Patent Literature 2, the tensile strength at the end of seedling raising (at the time of planting) is desirably 10 N/30 mm or more, more preferably 15 N/30 mm or more, and particularly preferably 20 N/30 mm or more. On the other hand, in the case of a nursery pot body of a type which is separated into individual paper containers (pot bodies) disclosed in Patent Literature 7, it is sufficient that the shape of the tubular paper container can be maintained, and the tensile strength is desirably 5N/30 mm or more. Note that the strength can be adjusted by appropriately setting the basis weight of the paper substrate and the thickness of the biodegradable resin layer.

<Paper Substrate>

As long as the paper substrate to be used in the present invention contains cellulose fibers as a main component, the type of the raw-material pulp and the content of cellulose fibers are not particularly limited. An example of the paper substrate is paper containing pulp to be used as a normal papermaking material. More specific examples thereof include unbleached, semi-bleached or bleached kraft pulp, sulfite pulp, semi-chemical pulp, soda pulp, mechanical pulp from softwood and hardwood, and used paper, and one type thereof can be used or two or more types thereof can be mixed and used in combination. In particular, those made of unbleached pulp can be preferably used.

The paper to be used in the present invention can contain as necessary various auxiliary agents that are usually used for paper making such as binders, fillers, paper strength enhancers, sizing agents, yield improvers, and preservatives, and synthetic fibers such as polyethylene and polyester. Further, the paper may be subjected to size treatment with starch, polyvinyl alcohol or the like, and may have a coat layer or a resin coat layer containing an inorganic pigment as a main component.

The basis weight of the paper substrate is not particularly limited, but ranges from preferably 20 $g/m^2$ to 200 $g/m^2$, more preferably 30 $g/m^2$ to 100 $g/m^2$, and particularly preferably 45 $g/m^2$ to 90 $g/m^2$.

<Biodegradable Resin>

"Biodegradable Resin"

The term "biodegradable resin" refers to a resin that has the same function as that of conventional petroleum-derived plastic when used, and that is, after use, biodegraded by microorganisms in natural soil and water in a certain period of time, and finally hydrolyzed to water and carbon dioxide.

Examples of the biodegradable resin to be used in the present invention can include an aliphatic polyester resin and an aromatic polyester resin.

Note that the aliphatic polyester of the present invention refers to an aliphatic polyester containing no aromatic ring, and the aliphatic polyester resin refers to an aliphatic polyester resin containing no aromatic ring. Further, the aromatic polyester of the present invention refers to a polyester containing an aromatic ring, and the aromatic polyester resin refers to a polyester resin containing an aromatic ring.

Examples of the aliphatic polyester resin include polylactic acid (PLA), polybutylene succinate (PBS), polybutylene succinate adipate (PBSA), polycaprolactone (PCL), polyhydroxybutyrate (PHB), or polyhydroxyvariate (PHV) or its copolymer (PHVB) and the like.

Note that the polylactic acid resin is resin (A) of the present invention. The polylactic acid resin is not particularly limited as lona as it is a condensate of lactic acid, and may be a poly-L-lactic acid resin, a poly-D-lactic acid resin, or a mixture thereof (for example, a stereo-complex type polylactic acid resin that is a mixture of a poly-L-lactic acid resin and a poly-D-lactic acid resin).

The aliphatic polyester resin other than the polylactic acid resin is resin (B) of the present invention. The aliphatic polyester resin other than the polylactic acid resin is an aliphatic polyester resin obtained by subjecting a dicarboxylic acid component comprising an aliphatic dicarboxylic acid and a diol component comprising an aliphatic diol to an esterification or transesterification reaction and a polycondensation reaction. For example, in the case of polybutylene succinate (PBS), it is obtained by subjecting a dicarboxylic acid component comprising succinic acid and a diol component comprising 1,4-butanediol to an esterification or transesterification reaction and a polycondensation reaction. Further, other components can also be contained. For example, other dicarboxylic acid components and other diol components can be contained. Examples of other dicarboxylic acid components include aliphatic dicarboxylic acids such as adipic acid, sebacic acid, and itaconic acid. Examples of other diol components include 2,3-butanediol, 1,3-butanediol, 1,4-pentanediol, 2,4-pentanediol, 1,6-hexanediol, neopentyl glycol, ethylene glycol, and diethylene glycol.

Examples of the aromatic polyester resin as resin (C) of the present invention include a polybutylene adipate terephthalate resin, a polybutylene terephthalate alkylate resin, and a polybutylene succinate terephthalate resin. In particular, polybutylene adipate terephthalate (PBAT) is preferable. Polybutylene adipate terephthalate (PBAT) is formed by a polycondensation reaction between a dicarboxylic acid component comprising adipic acid and terephthalic acid and a diol component comprising 1,4-butanediol, but other components can also be contained therein. For example, other dial components can be contained. Examples of other dial components can include 2,3-butanediol, 1,3-butanediol, 1,4-pentanediol, 2,4-pentanediol, 1,6-hexanediol, neopentyl glycol, ethylene glycol, and diethylene glycol.

"Blending Ratio of Biodegradable Resin"

One type of the above biodegradable resin may be used or two or more types thereof may be used in combination. Among them, when film moldability and physical properties are taken into consideration, an aliphatic polyester or an aromatic polyester having a melting point of 50° C. to 180° C. and a weight average molecular weight of 50,000 or more is preferable for obtaining a good molded product. Further, when biodegradability, flexibility, and stability over time are required, a mixed resin comprising two or more types of resin containing 15 mass % or more of a polylactic acid resin relative to the total mass of the biodegradable resin composition is preferable. The mixed resin is used for a nursery pot body, so that the pot body can maintain a certain strength at the time of planting without being decomposed during seedling raising and the decomposition speed after planting in a field can be increased through enzyme treatment immediately before and/or immediately after planting.

The content of the polylactic acid resin (resin (A)) ranges from 15 mass % to 40 mass %, preferably 18 mass % to 35 mass %, particularly preferably 20 mass % to 30 mass % relative to the total mass of the biodegradable resin composition. The biodegradable resin composition containing resin in an amount within such a range is suitable for maintaining properties including moldability, flexibility, stability over time, rot resistance while raising seedlings, and decomposability that is a property of being decomposed by a biodegradable resin-degrading enzyme.

The content of the aliphatic polyester resin (other than the polylactic acid resin) (resin (B)) ranges from 60 mass % to 85 mass %, preferably 65 mass % to 82 mass %, and particularly preferably 70 mass % to 80 mass % relative to the total mass of the biodegradable resin composition.

In addition to the above aliphatic polyester resin containing no aromatic ring, an aromatic polyester resin (resin (C)) is arbitrarily contained so that the progress rate of soil decomposition and enzyme reactivity in the field can be arbitrarily adjusted. In this case, the content of resin (B) above ranges from 30 mass % to 84.9 mass %, preferably 45 mass % to 77 mass % and particularly preferably 55 mass % to 72 mass % relative to the total mass of the biodegradable resin composition. The content of resin (C) ranges from 0.1 mass % to 30 mass %, preferably 5 mass % to 20 mass %, and particularly preferably 8 mass % to 15 mass % relative to the total mass of the biodegradable resin composition. These contents are suitable for maintaining the properties required for the nursery pot body, including rot resistance while raising seedlings, decomposability that is a property of being decomposed by a biodegradable resin-degrading enzyme, moldability, flexibility, and the like.

Examples of the aliphatic polyester resin can include "BioPBS (Registered Trademark) FZ71PM" (PTTMCC Biochem Co., Ltd., aliphatic polyester resin prepared by polycondensation of 1,4-butanediol and succinic acid, melting point: about 115° C.) and "GSPLA (Registered Trademark) FZ71PN" (Mitsubishi Chemical Corporation, obtained in the same manner as described above, melting point: about 115° C.).

Examples of the polylactic acid resin can include "Ingeo (Registered Trademark) 4032D" (NatureWorks LLC).

Examples of the aromatic polyester resin can include "Ecoflex" (BASF, an aromatic polyester resin obtained by polycondensation of 1,4-butanediol and an aromatic polyester comprising adipic acid and terephthalic acid, melting point: about 110° C.).

Further, through the use of 1 mass % to 10 mass % of an antiblocking agent per 100 mass % of the biodegradable resin composition in combination for the biodegradable resin composition, the moldability can be further improved. Specific examples of the anti-blocking agent include stable metal oxides such as silica, titanium dioxide and alumina, stable metal salts such as calcium carbonate, calcium phosphate and barium sulfate, or so-called organic beads obtained by coating a polylactic acid resin with an inert organic resin. One type of these anti-blocking agents may be used, or two or more types thereof may be used in combination.

Further, in the present invention, in addition to PCL, PBS, PBSA, a biodegradable aromatic polyester resin, and a nucleating agent, a known biodegradable resin, a non-biodegradable resin, an inorganic filler, an organic filler, an inorganic pigment, an organic pigment, an ultraviolet absorber, a light stabilizer, an antioxidant, and a lubricant may be blended, as long as the object of the present invention is not deviated.

"Laminating Method (Lamination)"

The biodegradable nursery pot body of the present invention comprises a laminated sheet prepared by laminating the above biodegradable resin on at least one surface of paper. The laminated sheet is prepared by subjecting a surface of a paper substrate to corona discharge treatment, frame treatment, anchor coating treatment, etc., and then extruding the biodegradable resin onto the treated surface for lamination. At this time, an example of a method to increase the processing stability of the extrusion lamination includes co-extruding a general-purpose plastic such as polyethylene together with the biodegradable resin, and then peeling off the general-purpose plastic film to obtain a laminated sheet of paper and the biodegradable resin.

The thickness of the biodegradable resin layer to be laminated on a paper substrate is not particularly limited, but ranges from preferably 5 µm to 80 µm, more preferably 15 µm to 50 µm, and particularly preferably 20 µm to 35 µm. Note that the physical strength of the nursery pot body and the progress of decomposition by enzyme treatment can be arbitrarily adjusted depending on the thickness of the resin layer.

<Method for Decomposing Biodegradable Resin>
"Biodegradable Resin-Decomposing Enzyme"

As the biodegradable resin-decomposing enzyme, conventionally known enzymes can be used, and examples thereof can include hydrolases such as lipase, cutinase, esterase, protease, lysophospholipase, amylase, glucoamylase, peptidase, serine hydrolase, cellulase, chitinase, xylanase, and pectinase and oxidoreductases such as peroxidase, monooxygenase, dioxygenase and laccase. Lipase, cutinase, esterase, protease and amylase are preferred. Specifically, a cutinase-like enzyme, PaE, produced by the yeast *Pseudozyma antarctica*, CmCut1 produced by *Cryptococcus magnus*-related strain BPD1A, CfCLE GB-1 produced by the *Cryptococcus flavus* GB-1 strain, and CfCLE Sb19-1 produced by the *Cryptococcus flavus* Sb19-1 strain, CLE produced by the *Cryptococcus* sp. S-2 strain and PCLE produced by the B47-9 strain of the filamentous fungus of the genus *Paraphoma* can be used. It should be noted that these biodegradable resin-decomposing enzymes differ from each other in optimum pH, optimum temperature range, etc. at which the enzyme activity is maximized, and these optimum pH and temperature range can also be set, so that the desired enzyme reaction can be appropriately performed utilizing these properties. As a difference in optimum pH, for example, PaE exhibits high enzymatic activity in the neutral to alkaline range, and its optimum pH is 9.5 (Non-Patent Literature 1). On the other hand, PCLE exhibits high enzymatic activity in the vicinity of the neutral range, and its optimum pH is 7.2 (Non-Patent Literature 2). In addition, it is known that the optimum pH of CmCut1 is 7.5 (Non-Patent Literature 3) and the optimum pH of CfCLE GB-1 is 7.8 (Non-Patent Literature 4).

"Origin of Enzyme"

The microorganism that produces a biodegradable resin-decomposing enzyme is not particularly limited, but any strain such as a strain isolated from the natural world is used. Specific examples of the microorganism can include microorganisms of the genus *Pseudomonas*, the genus *Pseudozyma*, the genus *Cryptococcus*, the genus *Acremonium*, the genus *Alternaria*, the genus *Arthrinium*, the genus *Aureobasidium*, the genus *Cladosporium*, the genus *Epicoccum*, the genus *Fusarium*, the genus *Paraphoma*, the genus *Penicillium*, the genus *Bacteroides*, the genus *Mucor*, the genus *Humicola*, the genus *Thermomyces*, the genus *Talaromyces*, the genus *Chaetomium*, the genus *Torula*, the genus *Sporotichum*, the genus *Malbranchea*, and the genus *Acidovorax*. More specifically, a foliar yeast, *Pseudozyma antarctica*, a *Cryptococcus magnus* related strain, BPD1A, *Cryptococcus flavus* GB-1 strain, *Cryptococcus flavus* Sb19-1 strain, *Pseudozyma antarctica* (accession date: Jul. 22, 2011) isolated from rice chaff collected in Ibaraki prefecture and deposited at the International Patent Organism Depositary (IPOD), National Institute of Technology and Evaluation (NITE) under accession No. FERM BP-22155, a filamentous fungus deposited at the IPOD, NITE under accession No. NITE P-573, and *Pseudozyma antarctica* JCM10317 strain provided as a standard strain at the Riken BioResource Research Center can be used. In particular, at least one type selected from the group consisting of the cutinase-like enzyme, PaE, produced by the yeast *Pseudozyma antarctica*, CmCut1 produced by *Cryptococcus magnus*-related strain BPD1A, CfCLE GB-1 produced by *Cryptococcus flavus* GP-1 strain and CfCLE Sb19-1 produced by *Cryptococcus flavus* Sb19-1 strain, CLE produced by a yeast of the genus *Cryptococcus* deposited under accession No. FERM P-15155, and PCLE produced by a filamentous fungus of the genus *Paraphoma* deposited under accession No. NITE P-573, or mixtures of the culture solutions thereof are preferably used.

Furthermore, bacteria, eukaryotic microorganisms, cultured cells, etc. can be recombined with a nucleic acid encoding a biodegradable resin-decomposing enzyme for artificial expression of the biodegradable resin-degrading enzyme. A specific example regarding the cutinase-like enzyme, PaE, produced by the yeast *Pseudozyma antarctica* is as described below. Gene PaCLE1 encoding PaE is registered under the registration number of GenBank Accession No. DM067526, and a method that involves incorporating PaCLE1 into *Pseudozyma antarctica* and a related species of *Pseudozyma antarctica* for obtaining PaE from the transformant according to the method described in paragraphs [0034] to [0038] of Patent Literature 8 is known.

"Polymer Water Absorbent"

In the method for decomposing a biodegradable nursery pot body of the present invention, a polymer water absorbent may also be applied to the pot body in addition to the biodegradable resin decomposing enzyme. Examples of the polymer water absorbent are not particularly limited, as long as they have sufficient water-retaining ability and have a property of adhering to the surface of a biodegradable nursery pot body while retaining water, and can include super absorbent polymers, starch derivatives, carboxyalkyl cellulose, hydroxyalkyl cellulose, polysaccharide derivatives, polyamino acid cross-linked products, and water absorbing materials made from fruit and vegetable waste as raw materials. Among these, carboxyalkyl cellulose is preferable, and carboxymethyl cellulose is particularly preferable. Through application of these polymer water absorbents to biodegradable nursery pot bodies, the polymer water absorbents are maintained on the surface of the biodegradable resin material for a long time while containing water and the biodegradable resin-decomposing enzyme and thus the biodegradable nursery pot bodies can be easily decomposed.

"Mixing Calcium Component With Enzyme"

Mixing of a calcium component with a biodegradable resin-decomposing enzyme can further promote the enzyme reaction (Patent Literature 5). When a biodegradable resin is immersed in an enzyme solution containing a biodegradable resin-decomposing enzyme or the like to decompose the biodegradable resin, the pH of the enzyme solution gradually decreases. Therefore, the pH of an object to be subjected to enzyme treatment is maintained within a range from neutral to slightly alkaline with reference to the optimum pH of the biodegradable resin-decomposing enzyme, making it possible to efficiently carry out the decomposition by the biodegradable resin-decomposing enzyme. Examples of materials that unlikely have an adverse effect on soil and crops include calcium salts and calcium-containing soil conditioner. Specifically, calcium carbonate, calcium oxide, calcium chloride, and calcium-containing minerals such as montmorillonite can be preferably used. Further, as the calcium-containing soil conditioner, a heavy calcium carbonate-containing soil conditioner or a light calcium carbonate-containing soil conditioner can be preferably used.

"Treatment Method With Enzyme Solution"

Feeding from the bottom of a nursery pot body, application to the surface, spraying, and spray irrigation are also preferable. Further, the polymer water absorbent may be applied simultaneously with or separately from the application of an enzyme solution.

EXAMPLES

<Preparation of Decomposing Enzyme>

A *Pseudozyma antarctica* culture solution containing PaE was prepared from *Pseudozyma antarctica* (accession No. FERM BP-22155) by the method described in paragraph [0021] of Patent Literature 6 (hereinafter, referred to as "PaE crude enzyme solution of the present invention"), and then the concentration was measured based on the enzyme activity by the method described in detail below.

Then, the solution was adjusted with a 20 mM Tris-HCl buffer (pH 8.0) in such a manner that the predetermined amount of the enzyme solution was obtained. Further, if necessary, calcium carbonate (Softon) was mixed.

<Determination of the Activity of Biodegradable Resin-Decomposing Enzyme>

The activity of a biodegradable resin-decomposing enzyme was determined according to the following method for determining the activity of a decomposing enzyme described in paragraph [0019] of Patent Literature 5.

"First, 1730 μL of a 20 mM Tris-HCl buffer (pH 6.8) and 30 μL of an aqueous solution prepared by dissolving as a substrate a predetermined amount of PBSA emulsion EM-301 solution in water are added to a test tube having an inner diameter of 10 mm and then mixed. Further, 40 μL of a 100 mM calcium chloride solution is added as needed.

Next, a culture solution of a microorganism that produces a biodegradable resin-decomposing enzyme is obtained, the microorganism is removed by centrifugation, and then 200 μL of a supernatant is obtained and added to the above test tube. The mixture to which the supernatant has been added is stirred with a vortex, and the transmittance at 660 nm is measured using a turbidity meter. Then, at 30° C., the transmittance at the time of mixing and the transmittance 15 minutes after mixing are found while the test tube is shaken at 220 rpm. The transmittance obtained by the use of the turbidity meter is converted into absorbance by the following formula (1), and the enzyme activity is found from the obtained absorbance by the following formula (2).

$$At = -\log(X/100) \quad (1)$$

$$C = (A0 - A15) \times 10/15 \, [\text{U/mL/min}] \quad (2)$$

(In the above formula (1), "At" indicates the absorbance at time t (min.), "X" indicates the transmittance. In the above formula (2), "C" indicates the enzymatic activity, and "A0" and "A15" indicate the absorbance at the time of mixing and the absorbance 15 minutes after mixing, respectively.)"

<Measurement and Evaluation of Test Sample Performance>

(1) Measurement was performed by a method according to the Wet tensile strength (reference), tensile strength after enzyme treatment: HS P8113: 1998 "Paper and board-Determination of tensile properties-Part 2: Constant rate of elongation method" using a constant-rate elongation type tensile tester (autograph tensile tester, Shimadzu Corporation). The size of each sample was 30 mm×70 mm, the sample was subjected to a pulling force at a chuck span of 30 mm and a tensile speed of 10 mm/min, and the strength at break was measured. The measurement was repeated 8 times to calculate the mean (and standard deviation).

(2) Measurement was performed by a method according to the Tensile strength after soil-burial treatment: JIS P8113: 1998 "Paper and board-Determination of tensile properties-Part 2: Constant rate of elongation method" using a constant rate elongation type tensile tester (autograph tensile tester, Shimadzu Corporation). The size of each sample was 30 mm×70 mm, the sample was subjected to a pulling force at a chuck span of 30 mm, and the tensile speed of 100 mm/min, and the strength at break was measured. The measurement was repeated 4 times to calculate the mean (and standard deviation).

Example 1

Test for Temporal Stability (Soil-Burial Test)

Samples 2 years after production and samples less than 1 year after production were compared for strength and temporal stability in Example 1.

"Production of Biodegradable Resin Composition-Laminated Paper"

Resin compositions having the blending ratios of (A) to (D) and (a) to (d) shown in Table 1 below were pre-dried, and then laminated on unbleached kraft paper (paper substrate) having a basis weight of 84 g/m², thereby preparing laminated paper having two patterns of resin composition layers (lamination layers) with a thickness of 30 μm and a thickness of 15 μm, respectively.

Note that each sample less than 1 year after production is denoted by "symbol-1", and each sample 2 years after production is denoted by "symbol-2".

TABLE 1

| Sample No | Resin composition (mass ratio) PBS | PLA | PBAT | Additive | Lamination thickness (μm) | Paper substrate Pulp type | Basis weight (g/m²) | Corona treatment | Number of years after production |
|---|---|---|---|---|---|---|---|---|---|
| A-1 | 100 | — | — | — | 30 | Unbleached kraft | 84 | — | Less than 1 year |
| a-1 | 100 | — | — | — | 15 | Unbleached kraft | 84 | — | Less than 1 year |
| B-1 | 90 | 10 | — | — | 30 | Unbleached kraft | 84 | — | Less than 1 year |
| b-1 | 90 | 10 | — | — | 15 | Unbleached kraft | 84 | — | Less than 1 year |
| C-1 | 80 | 20 | — | — | 30 | Unbleached kraft | 84 | — | Less than 1 year |
| c-1 | 80 | 20 | — | — | 15 | Unbleached kraft | 84 | — | Less than 1 year |
| D-1 | 70 | 30 | — | — | 30 | Unbleached kraft | 84 | — | Less than 1 year |
| d-1 | 70 | 30 | — | — | 15 | Unbleached kraft | 84 | — | Less than 1 year |
| A-2 | 100 | — | — | — | 30 | Unbleached kraft | 84 | — | 2 years |
| a-2 | 100 | — | — | — | 15 | Unbleached kraft | 84 | — | 2 years |
| B-2 | 90 | 10 | — | — | 30 | Unbleached kraft | 84 | — | 2 years |
| b-2 | 90 | 10 | — | — | 15 | Unbleached kraft | 84 | — | 2 years |
| C-2 | 80 | 20 | — | — | 30 | Unbleached kraft | 84 | — | 2 years |
| c-2 | 80 | 20 | — | — | 15 | Unbleached kraft | 84 | — | 2 years |
| D-2 | 70 | 30 | — | — | 30 | Unbleached kraft | 84 | — | 2 years |
| d-2 | 70 | 30 | — | — | 15 | Unbleached kraft | 84 | — | 2 years |

"Soil-Burial Test"

Test pieces were cut out into a size of 30 mm×70 mm and soil-buried in vegetable potting soil (our super potting soil, pH 6.74, EC 1.81 dS/m) having an adjusted water content of 50%, and left to stand in a plant growth chamber (Nippon Medical & Chemical Instruments CO., LTD.) at a temperature of 30° C. and a humidity of 90%. Two weeks after standing, each sample was taken out, the shape was observed, and then the tensile strength of the sample was measured with an autograph tensile tester (Shimadzu Corporation) under the conditions of a chuck span of 30 mm and a test speed of 100 mm/min. The test was performed in 4 iterations. For the strength of the sample before soil-burial, the test piece was immersed in water for 24 hours, and the value measured under the same conditions was used.

Figure 2A:
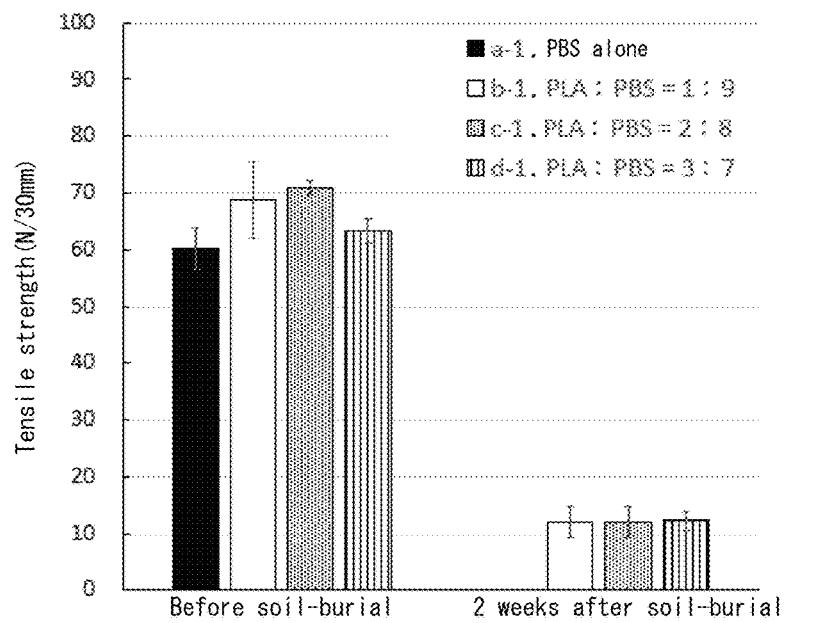
FIG. 2 shows the tensile strengths of biodegradable resin composition-laminated paper (lamination thickness: 15 μm) samples not subjected to enzyme treatment, graph (A): samples less than one year after production, after two weeks of soil-burial, and graph (B): samples two years after production, after two weeks of soil-burial.
Figure 2B:
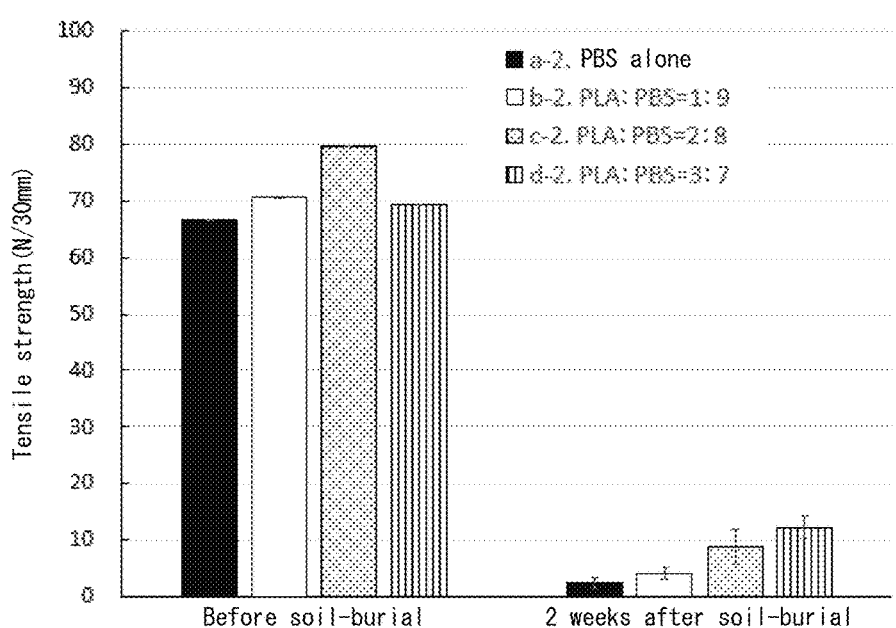

As shown in FIGS. 1 and 2, the strengths after soil-burial are higher for 30 μm-thick samples than those of 15 μm-thick samples, and particularly high for (C-1), (C-2), (D-1) and (D-2) containing PLA accounting for 20% or more. In the cases of (C-2) and (D-2), the strengths of the samples 2 years after production tend to be slightly lower than the strengths of the samples less than one year after production, but the strengths are almost equivalent to each other. Hence, the degree of aged deterioration is considered to be low.

On the other hand, the strengths of samples (A-2) and (B-2) containing PLA accounting for less than 20% are lower than those of (C-2) and (D-2), and the strengths of (a-2) and (b-2) containing PLA accounting for less than 20% are lower than those of (c-2) and (d-2). The results are the same when the strengths are compared with the strengths of the samples one year after production. It is presumed that such a sample containing PLA accounting for less than 20% tends to deteriorate over time. In any case, (a) and (b) or (A) and (B) have low strengths after soil-burial and are considered to be impractical. Therefore, if the PLA content is 20% or more, the sample maintains sufficient strength after soil-burial, and the degree of deterioration over time is low even after 2 years or more.

Example 2

Test on Temporal Stability (Enzyme Treatment) Samples 2 Years After Production

In order to evaluate the temporal stability against the biodegradation action of an enzyme, the physical strength of samples 2 years after production was determined.

"Production of Biodegradable Resin Composition-Laminated Paper"

Resin compositions having the blending ratios of (A-2), (B-2), (C-2) and (D-2) shown in Table 2 below were pre-dried, each of them was laminated on unbleached kraft paper (paper substrate) having a basis weight of 84 g/m², so as to prepare laminated paper having a resin composition layer (lamination layer) with a thickness of 30 μm. The thus prepared laminated paper was used as a sample at 2 years after production.

TABLE 2

| Sample No | Resin composition (mass ratio) | | | | Lamination thickness (μm) | Paper substrate | | Corona treatment | Number of years after production |
|---|---|---|---|---|---|---|---|---|---|
| | PBS | PLA | PBAT | Additive | | Pulp type | Basis weight (g/m$^2$) | | |
| A-2 | 100 | — | — | — | 30 | Unbleached kraft | 84 | — | 2 years |
| B-2 | 90 | 10 | — | — | 30 | Unbleached kraft | 84 | — | 2 years |
| C-2 | 80 | 20 | — | — | 30 | Unbleached kraft | 84 | — | 2 years |
| D-2 | 70 | 30 | — | — | 30 | Unbleached kraft | 84 | — | 2 years |

"Enzyme Solution Immersion Test"

The PaE crude enzyme solution of the present invention was diluted with a 20 mM Tris-HCl (pH 8.0) buffer solution in such a manner that the concentration was 4.69±0.50 U/mL.

Samples were each cut into 30 mm squares, and the weight of each sample (test piece) was measured. Subsequently, the sample was immersed in an enzyme solution prepared by the above method and shaken in an incubator (Nippon Medical & Chemical Instruments CO., LTD.) set at 30° C. for 24 hours. The sample was then taken out and the weight was measured. The decomposition rate was calculated from a weight difference between before and after immersion. The decomposition rate of only the biodegradable resin composition (also referred to as biodegradable plastic) was estimated from the basis weight of the paper substrate.

As shown in Table 3, the decomposition rates after 24 hours are about 20% for (A-2), (B-2), and (C-2), and about 8% for (D-2). The decomposition rates of the biodegradable resin compositions alone respectively range from about 70% to 80% for (A-2), (B-2) and (C-2), about 30% for (D-2), and the progress of decomposition is successfully suppressed when the PLA content is 30%.

TABLE 3

Decomposition rate after immersion in enzyme solution (24 h)
Parenthesized numerical values indicate the decomposition rates of biodegradable resin composition alone.

| Sample | Decomposition rate (%) |
|---|---|
| A-2 | 23.5 ± 2.7 (76.1) |
| B-2 | 23.4 ± 2.2 (83.3) |
| C-2 | 22.6 ± 4.3 (70.2) |
| D-2 | 8.3 ± 0.5 (26.9) |

Numerical value ± standard deviation (n = 3)

"Soil-Burial Test"

The PaE crude enzyme solution of the present invention was diluted with a 20 mM Tris-HCl (pH 8.0) buffer solution, and calcium carbonate (Softon) was further mixed so that it accounted for 2% in terms of weight ratio. The thus obtained mixture having activity of 7.80±0.66 U/mL was used.

Samples were each cut into a size of 30 mm×70 mm and soil-buried in vegetable potting soil (our super potting soil, pH 6.74, EC 1.81 dS/m) having an adjusted water content of 50%, and then left to stand in a plant growth chamber (Nippon Medical & Chemical Instruments CO., LTD.) at a temperature of 30° C. and a humidity of 90%. Each sample was taken out 2 weeks and 4 weeks after standing, the shape was observed, and then the tensile strength was measured using an autograph tensile tester (Shimadzu Corporation) under the conditions of a chuck span of 30 mm and a test speed of 10 min/min. An untreated sample was also prepared by immersing a sample in water in the same manner as in enzyme treatment that involves immersing a sample in an enzyme solution at normal temperature for 3 hours. As the value of the strength of each test piece before soil-burial, a value measured under the same conditions after immersion of a test piece in water for 12 hours was used. The test was performed in 4 iterations.

Figure 3A:
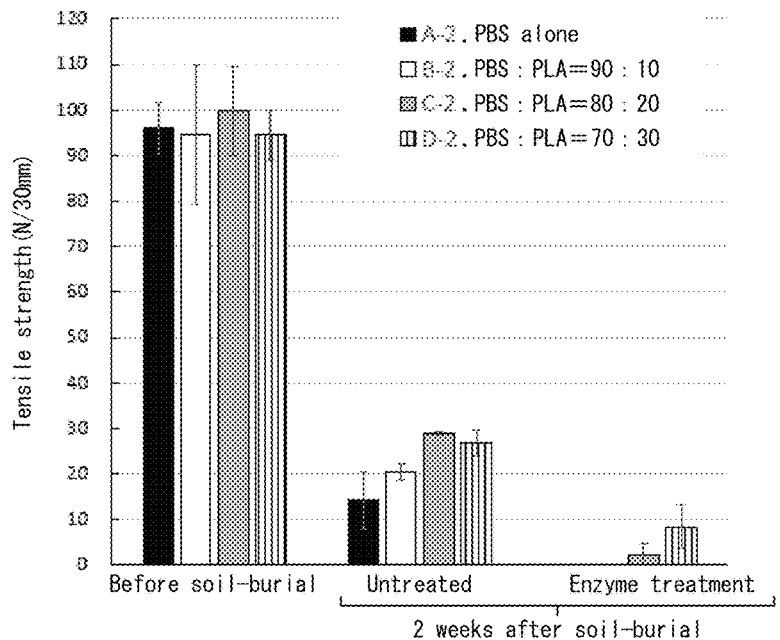
FIG. 3 shows the tensile strengths of biodegradable resin composition-laminated paper (lamination thickness: 30 μm) samples two years after production with enzyme treatment and two years after production without enzyme treatment, graph (A): samples after two weeks of soil-burial, and graph (B): samples after four weeks of soil-burial.
Figure 3B:
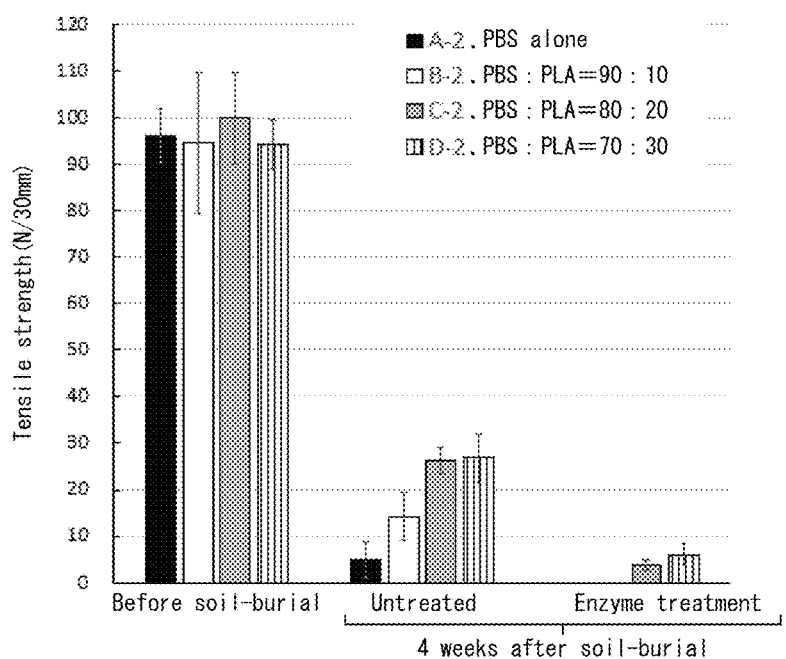

As shown in FIG. 3, the tensile strength after 2 weeks of soil-burial is higher in the order of (A-2)<(B-2)<(C-2)=(D-2). The higher the content of PLA, the more difficult the decomposition. Whereas the strengths of (A-2) and (B-2) after 4 weeks of soil-burial are lower than those after 2 weeks, indicating the progress of decomposition, (C-2) and (D-2) maintain sufficient strength even after 4 weeks of soil-burial. Two or more years have passed after preparation of the sample and it is presumed that a sample containing PLA accounting for 20% or more exhibits a low degree of aged deterioration.

Further, enzyme-treated samples are found to have tensile strengths lower than those of untreated samples. The decomposition promoting effect of the enzyme treatment is sufficiently confirmed.

Example 3

Addition Test (Enzyme Treatment) of Aromatic Polyester Resin

<Production of Biodegradable Resin Composition-Laminated Paper>

The resin compositions having the blending ratios of (K) to (N) shown in Table 4 below were pre-dried and laminated on unbleached kraft paper (paper substrate) having a basis weight of 50 g/m$^2$ subjected to or not subjected to corona treatment, so as to prepare laminated paper having a resin composition layer (lamination layer) with a thickness of 30 μm. The thus prepared laminated paper was used as a sample less than 1 year after production.

TABLE 4

| Sample No | Resin composition (mass ratio) | | | Additive | Lamination thickness (μm) | Paper substrate | | | |
|---|---|---|---|---|---|---|---|---|---|
| | PBS | PLA | PBAT | | | Pulp type | Basis weight (g/m²) | Corona treatment | Number of years after production |
| K-1 | 68.0 | 19.9 | 12.1 | — | 30 | Unbleached kraft | 50 | Treated | Less than 1 year |
| K-2 | 68.0 | 19.9 | 12.1 | — | 30 | Unbleached kraft | 50 | — | Less than 1 year |
| L-1 | 58.0 | 29.9 | 12.1 | — | 30 | Unbleached kraft | 50 | Treated | Less than 1 year |
| L-2 | 58.0 | 29.9 | 12.1 | — | 30 | Unbleached kraft | 50 | — | Less than 1 year |
| M-1 | 80 | 20 | — | — | 30 | Unbleached kraft | 50 | Treated | Less than 1 year |
| M-2 | 80 | 20 | — | — | 30 | Unbleached kraft | 50 | — | Less than 1 year |
| N-1 | 70 | 30 | — | — | 30 | Unbleached kraft | 50 | Treated | Less than 1 year |
| N-2 | 70 | 30 | — | — | 30 | Unbleached kraft | 50 | — | Less than 1 year |

"Enzyme Solution Immersion Test"

The PaE crude enzyme solution of the present invention was diluted with a 20 mM Tris-HCl (pH 8.0) buffer solution in such a manner that the concentration was 4.69±0.50 U/mL.

Samples were each cut into 30 mm squares and the weight of each sample (test piece) was measured. Subsequently, each sample was immersed in an enzyme solution prepared by the above method and shaken in an incubator (Nippon Medical & Chemical Instruments CO., LTD.) set at 30° C. for 24 hours. The sample was then taken out and the weight was measured. The decomposition rate was calculated from a weight difference between before and after immersion. The decomposition rate of only the biodegradable resin composition was also estimated from the basis weight of the paper substrate.

As shown in Table 5, the decomposition rate after 24 hours is about 30% for K, L, and M, and about 20% for N, regardless of the presence or absence of corona treatment. The estimated decomposition rate of only the biodegradable resin composition after subtracting that of the paper portion is about 70% for K, L, and M, and about 30% to 40% for N. The higher the content of PLA mixed, the more suppressed decomposition by the enzyme, and among the samples (L and N) containing PLA in an amount of 30%, L containing PBAT is more easily decomposed than N.

TABLE 5

Decomposition rate after immersion in enzyme solution (24 h)
Parenthesized numerical values indicate the decomposition rates of biodegradable resin composition alone.

| Sample | Decomposition rate (%) |
|---|---|
| K-1 | 31.1 ± 10.8 (67.6) |
| L-1 | 28.8 ± 6.2 (66.8) |
| M-1 | 33.5 ± 4.5 (74.8) |
| N-1 | 18.9 ± 2.5 (42.3) |
| K-2 | 34.5 ± 6.5 (74.7) |
| L-2 | 31.1 ± 10.7 (68.6) |
| M-2 | 30.9 ± 5.3 (73.7) |
| N-2 | 14.8 ± 2.7 (33.1) |

Numerical value ± standard deviation (n = 3)

"Soil-Burial Test"

The PaE crude enzyme solution of the present invention was diluted with a 20 mM Tris-HCl (pH 8.0) buffer solution, and calcium carbonate (Softon) was further mixed so that it accounted for 2% in terms of weight ratio. The thus obtained mixture having activity of 7.80±0.66 U/mL was used.

Samples were each cut into a size of 30 mm×70 mm and soil-buried in vegetable potting soil (our super potting soil, pH 6.74, EC 1.81 dS/m) having an adjusted water content of 50%, and then left to stand in a plant growth chamber (Nippon Medical & Chemical Instruments CO., LTD.) at a temperature of 30° C. and a humidity of 90%. Each sample was taken out 2 weeks and 4 weeks after standing, the shape was observed, and then the tensile strength was measured using an autograph tensile tester (Shimadzu Corporation) under the conditions of a chuck span of 30 mm and a test speed of 10 mm/min. An untreated sample was also prepared by immersing a sample in water in the same manner as in enzyme treatment that involves immersing a sample in an enzyme solution at normal temperature for 3 hours. As the value of the strength of each test piece before soil-burial, a value measured under the same conditions after immersion of a test piece in water for 12 hours was used. The test was performed in 4 iterations.

Figure 4A:
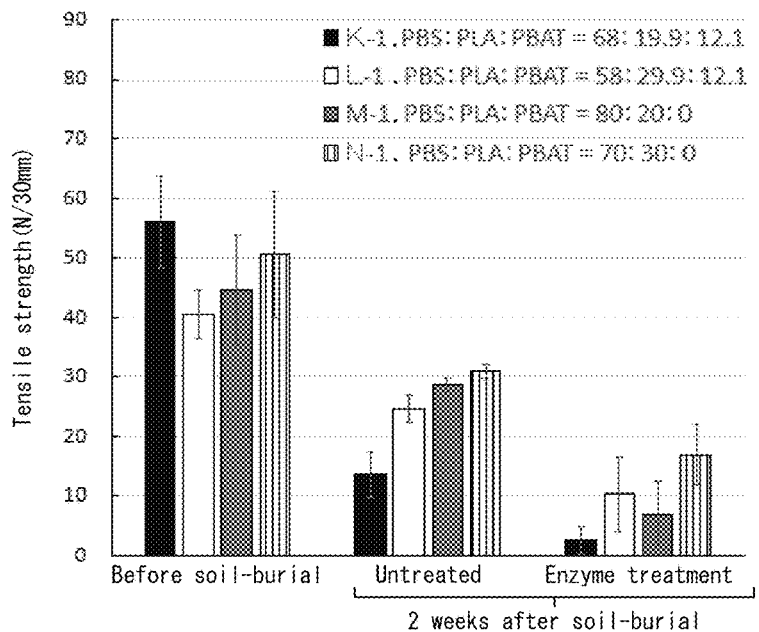
FIG. 4 shows the tensile strengths of biodegradable resin composition-laminated paper (lamination thickness: 30 μm) samples subjected to corona treatment, at less than one year after production with enzyme treatment and at less than one year after production without enzyme treatment, graph (A): samples after two weeks of soil-burial, and graph (B): samples after four weeks of soil-burial.
Figure 4B:
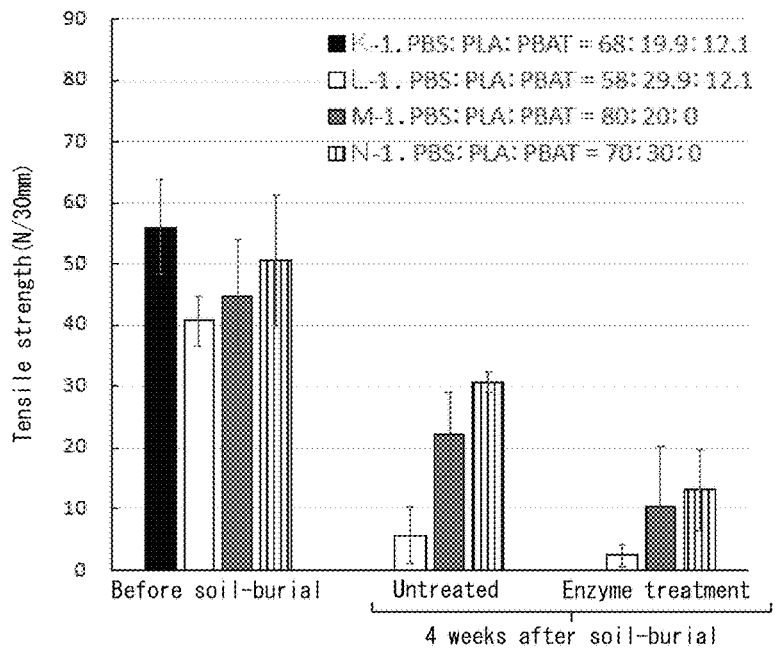
Figure 5A:
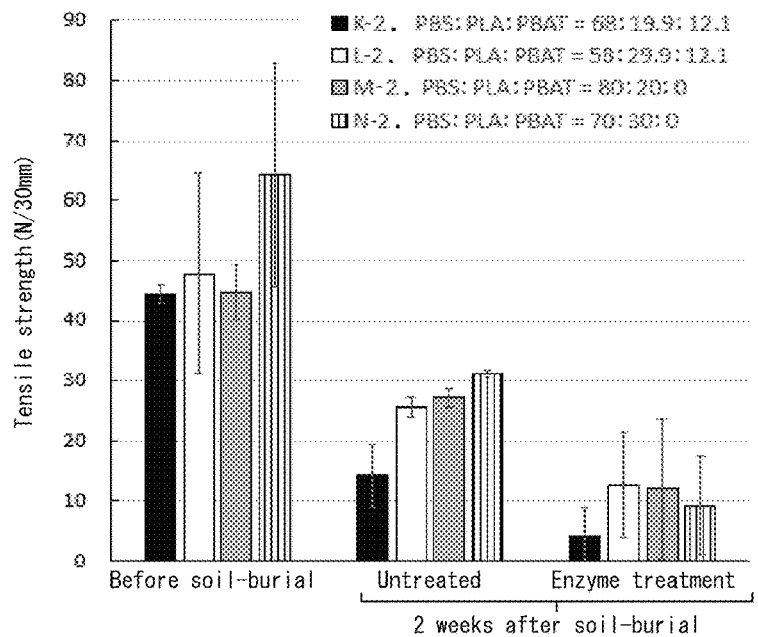
FIG. 5 shows the tensile strengths of biodegradable resin composition-laminated paper (lamination thickness: 30 μm) samples not subjected to Corona treatment, at less than one year after production with enzyme treatment and production without enzyme treatment, graph (A): samples after two weeks of soil-burial, and graph (B): samples after four weeks of soil-burial.
Figure 5B:
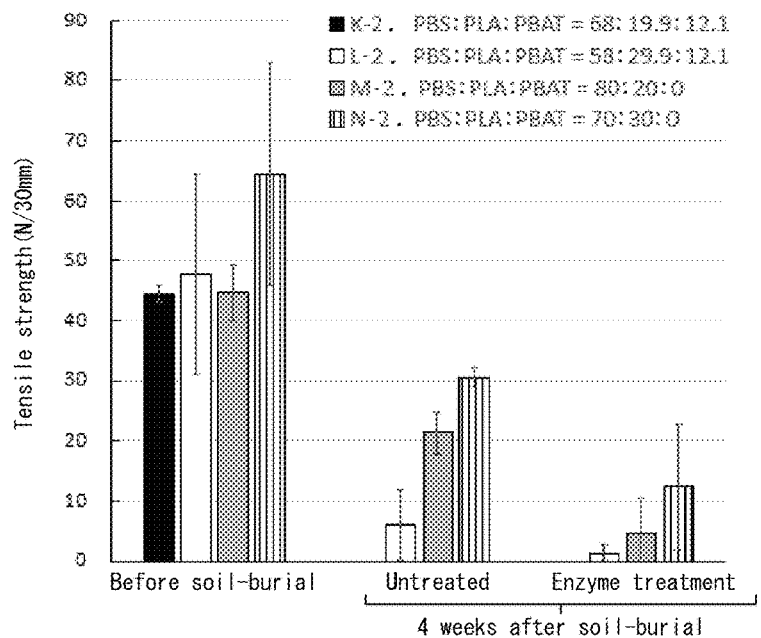

Further, as shown in FIGS. 4 and 5, the tensile strengths of untreated samples after 2 weeks of soil-burial are higher in the order of K<L<M<N. The degree of decomposition differs depending on the content of PLA and the presence or absence of mixing with PBAT. Specifically, biodegradation can be controlled based on the content of PLA and the presence or absence of mixing with PBAT.

Further, as shown in FIGS. 4 and 5, the tendency is remarkable 4 weeks after soil-burial. In this test, replacement of a portion of PBS with PBAT tends to facilitate decomposition. The tensile strength of the enzyme-treated sample exhibits the same tendency, but the strength is lower than that of the untreated sample, and thus the decomposition promoting effect of the enzyme treatment is confirmed. Note that no difference is confirmed in the degree of decomposition due to corona discharge treatment.

Furthermore, as shown in FIGS. 4 and 5, a certain degree of rot resistance is observed in the enzyme-untreated 2-week soil-burial test for K-1, K-2, L-1, and L-2. In the 4-week soil-burial test, the rot resistance is extremely weak. That is, nursery pot bodies comprising biodegradable resin compositions of K-1, K-2, L-1, and L-2 are suitable for short-term seedling raising, and are quickly biodegraded after transplantation, so that the generation of nursery pot body residues can be reduced.

| 0-1 | Form PCT/RO/134 Indications Relating to Deposited Microorganism or Other Biological Material | |
|---|---|---|
| 0-1-1 | (PCT Rule 13.2) were created as stated to the right. | JPO-PAS i410 |
| 0-2 | International application no. | PCT/JP2021/003951 |
| 0-3 | Applicant's or agent's file reference | HP1449 |
| 1 | The indications made below relate to the deposited microorganism or other biological material referred to in the description. | |
| 1-1 | Paragraph number | 0034, 0039 |
| 1-3 | Identification of deposit | |
| 1-3-1 | Name of depositary institution | IPOD International Patent Organism Depositary, National Institute of Technology and Evaluation (NITE-IPOD) |
| 1-3-2 | Address of depositary institution | #120, 2-5-8 Kazusakamatari, Kisarazu-shi, Chiba 2920818, Japan |
| 1-3-3 | Date of deposit | Jul. 22, 2011 |
| 1-3-4 | Accession number | IPOD FERM BP-22155 |
| 1-5 | Designated states for which indications are made | All designated states |
| For receiving Office use only | | |
| 0-4 | This sheet was received with the international application (yes/no) | ✓ |
| 0-4-1 | Authorized officer | Kenichi OKUTANI |
| For International Bureau use only | | |
| 0-5 | This sheet was received by the International Bureau on: | |
| 0-5-1 | Authorized officer | |

The invention claimed is:

1. A base paper for a nursery pot body with a paper substrate on which a biodegradable resin composition is laminated, wherein
the nursery pot body made of the base paper is subject to an enzyme treatment immediately before planting in a field so as to accelerate decomposition of the nursery pot body,
the biodegradable resin composition contains a polylactic acid resin as a resin (A), the biodegradable resin composition being laminated on the paper substrate and polybutylene succinate (PBS) as a resin (B),
a mass ratio between the resin (A) and the resin (B) is 20:80 to 30:70, and
a thickness of the biodegradable resin layer to be laminated on the paper substrate is 20 μm to 35 μm.

2. The base paper for a nursery pot body according to claim 1, wherein the resin (B) is an aliphatic polyester resin prepared by polycondensing a dicarboxylic acid component comprising an aliphatic dicarboxylic acid and a diol component comprising an aliphatic diol.

3. A nursery pot body, comprising the base paper for a nursery pot body according to claim 1.

4. A method for decomposing a nursery pot body with a step of bringing a biodegradable resin-decomposing enzyme into contact with the nursery pot body according to claim 3 so as to biodegrade the nursery pot body.

5. The method for decomposing the nursery pot body according to claim 4, wherein the biodegradable resin-decomposing enzyme is a biodegradable resin-decomposing enzyme produced by at least one type of microorganisms selected from the group consisting of a yeast of the genus *Pseudozyma*, a yeast of the genus *Cryptococcus*, a filamentous fungus of the genus *Acremonium*, a filamentous fungus of the genus *Alternaria*, a filamentous fungus of the genus *Arthrinium*, a filamentous fungus of the genus *Aureobasidium*, a filamentous fungus of the genus *Cladosporium*, a filamentous fungus of the genus *Epicoccum*, a filamentous fungus of the genus *Fusarium*, a filamentous fungus of the genus *Paraphoma* and a filamentous fungus of the genus *Penicillium*.

\* \* \* \* \*